(12) United States Patent
Cagle

(10) Patent No.: US 6,265,004 B1
(45) Date of Patent: Jul. 24, 2001

(54) POULTRY VISCERAL CAVITY SHAPING METHOD AND PRODUCT

(76) Inventor: G. Douglas Cagle, 554 Gramercy Dr., Marietta, GA (US) 30068

( * ) Notice: Subject to any disclaimer, the term of this patent is extended or adjusted under 35 U.S.C. 154(b) by 0 days.

(21) Appl. No.: 09/443,660

(22) Filed: Nov. 19, 1999

(51) Int. Cl.$^7$ .................................................. A22C 21/00
(52) U.S. Cl. .......................... 426/132; 426/129; 426/393; 426/420; 426/523; 426/524; 426/644; 99/419; 99/426; 99/428; 99/450
(58) Field of Search .................................. 426/132, 420, 426/644, 393, 524, 523, 129; 99/419, 442, 421 A, 421 H, 441, 426, 449, 447, 450, 428; 452/124, 197, 198

(56) References Cited

U.S. PATENT DOCUMENTS

| | | | |
|---|---|---|---|
| 1,589,849 | * | 6/1926 | Haskell .................................... 99/428 |
| 1,797,606 | * | 3/1931 | Crider .................................... 426/644 |
| 2,590,785 | | 3/1952 | Nealy . |
| 3,147,513 | | 9/1964 | Schneider et al. . |
| 3,196,777 | * | 7/1965 | Luker .................................... 99/428 |
| 3,262,668 | * | 7/1966 | Luker .................................... 99/428 |
| 3,392,665 | * | 7/1968 | Harnest .................................... 99/426 |
| 3,623,892 | * | 11/1971 | Koonz et al. . |
| 3,705,440 | | 12/1972 | Lewis . |
| 3,778,867 | | 12/1973 | Sindler et al. . |
| 3,921,255 | | 11/1975 | LaBarber . |
| 4,023,237 | | 5/1977 | Meyn . |
| 4,027,583 | * | 6/1977 | Spanek et al. ..................... 99/426 |
| 4,127,060 | * | 11/1978 | Curtis .................................... 99/419 |
| 4,450,759 | * | 5/1984 | Steibel .................................... 99/419 |
| 4,633,773 | * | 1/1987 | Jay .................................... 99/426 |
| 4,704,768 | | 11/1987 | Hutting et al. . |
| 4,709,626 | * | 12/1987 | Hamlyn .................................... 99/426 |
| 5,081,916 | * | 1/1992 | Kunung et al. ..................... 99/426 |
| 5,098,334 | | 3/1992 | Molaug .................................... 452/116 |
| 5,106,642 | * | 4/1992 | Ciofalo .................................... 99/426 |
| 5,123,871 | | 6/1992 | van den Nieuwelaar et al. .. 452/122 |
| 5,133,686 | | 7/1992 | van den Nieuwelaar et al. .. 452/122 |
| 5,301,602 | * | 4/1994 | Ryczek .................................... 99/419 |
| 5,580,304 | | 12/1996 | Bleth et al. ..................... 452/122 |
| 5,586,489 | * | 12/1996 | Fraga .................................... 99/419 |
| 5,688,164 | | 11/1997 | Mills et al. ..................... 452/122 |
| 5,741,176 | | 4/1998 | Lapp et al. ..................... 452/122 |
| 5,893,320 | * | 4/1999 | Demaree .................................... 99/419 |
| 6,062,131 | * | 5/2000 | Holland .................................... 99/419 |

* cited by examiner

Primary Examiner—Steven Weinstein
(74) Attorney, Agent, or Firm—Thomas, Kayden, Horstemeyer & Risley

(57) ABSTRACT

The poultry shaping mandrel (25) is utilized to retain the shape of previously eviscerated oven-ready whole bird carcasses (10) after the carcasses have been prepared and before they are packaged and shipped. When the bird is frozen, the mandrels retain the shape of the bird so that the bird and its mandrel can be mounted on a skewer (52) or a smaller hand held skewer can be thrust through the mandrel and through the bird without hazard of deteriorating the bird.

17 Claims, 3 Drawing Sheets

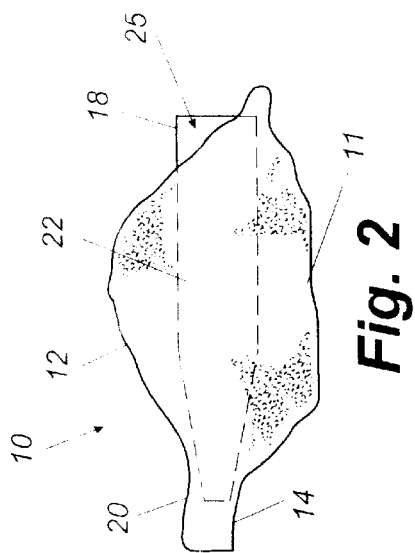
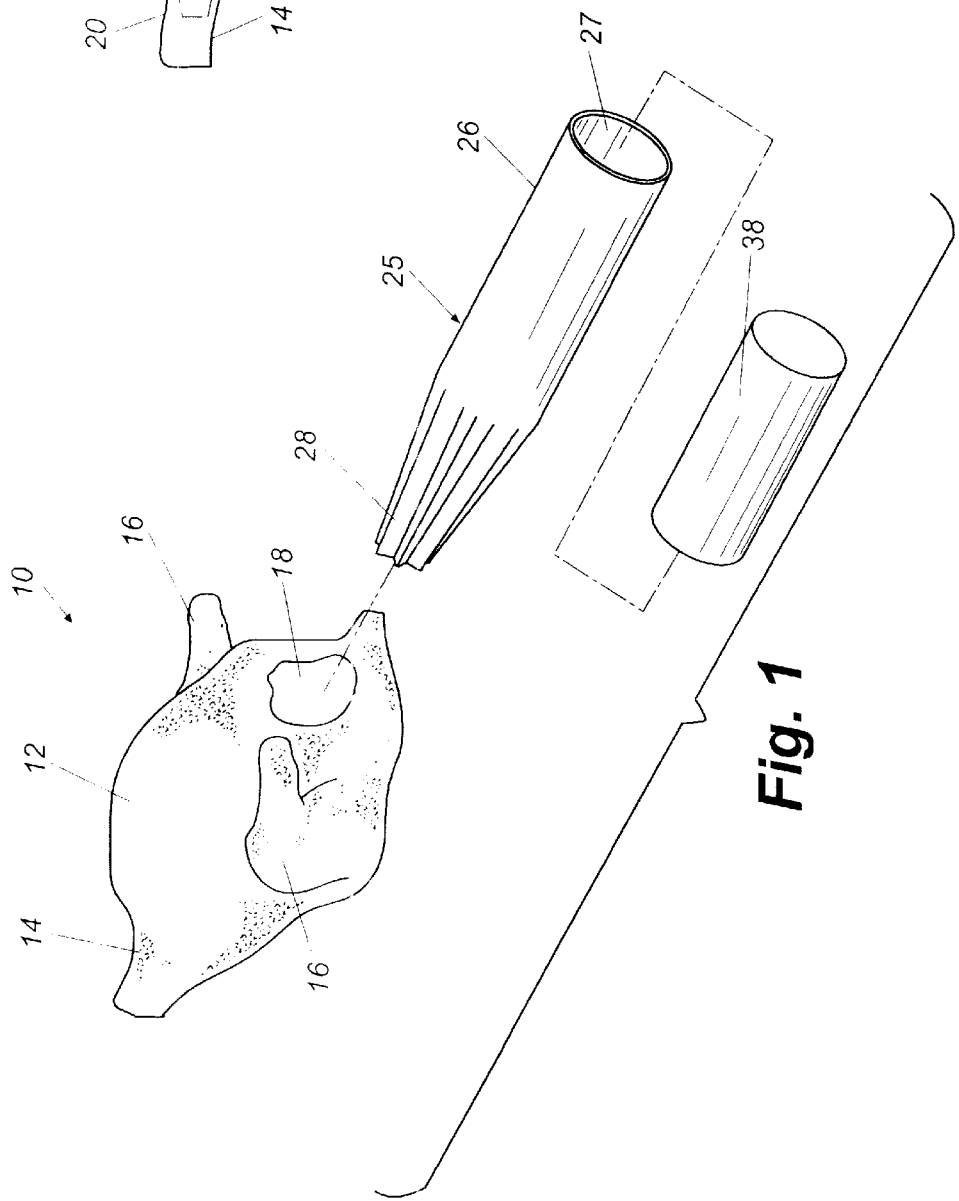

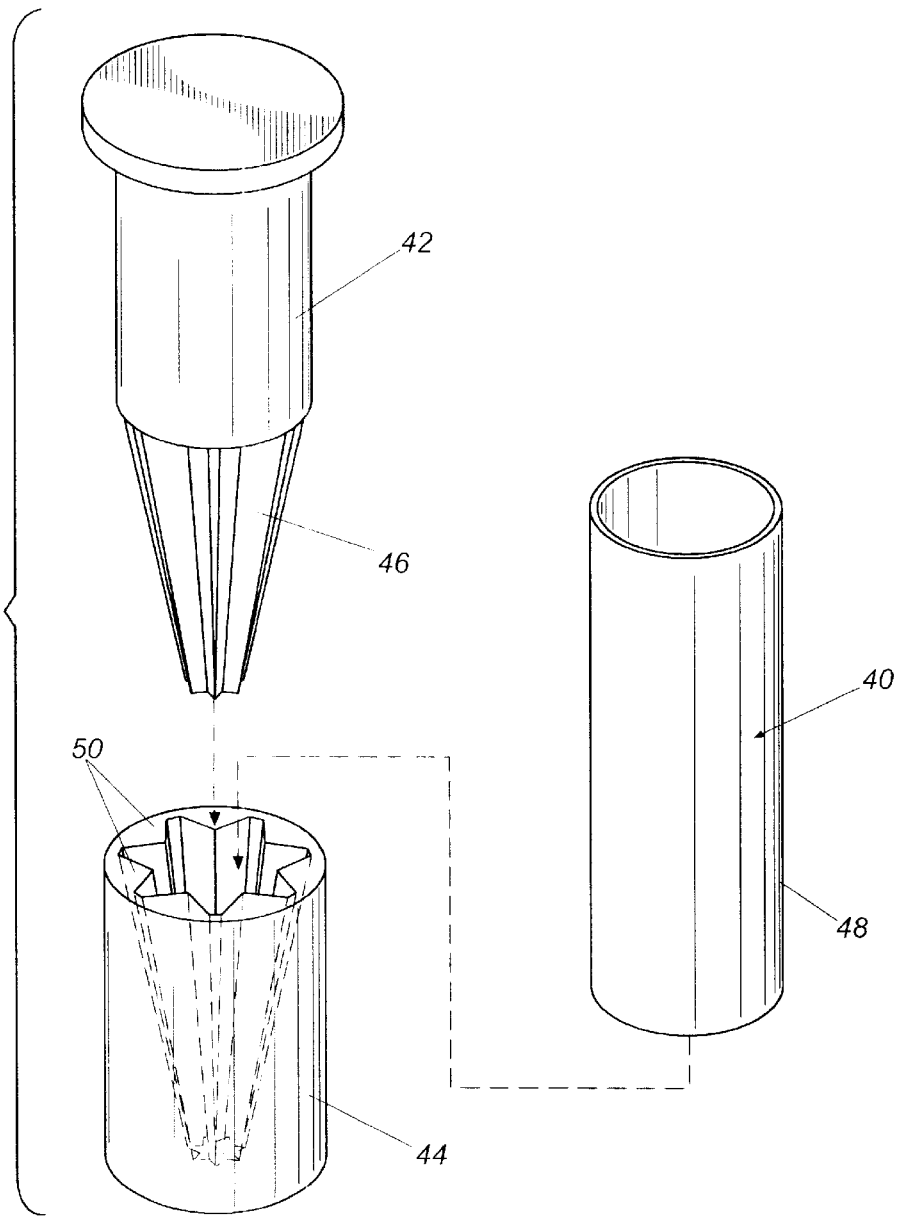

POULTRY VISCERAL CAVITY SHAPING METHOD AND PRODUCT

FIELD OF THE INVENTION

This invention relates to shaping the carcass of a previously eviscerated oven-ready carcass of a bird, so that the bird does not lose its shape when delivered to the market place, either in fresh or frozen condition. More particularly, the invention relates to a mandrel inserted into the eviscerated body cavity and neck cavity of a bird so as to distend the neck of the bird and fill the body cavity of the bird, to keep the bird from collapsing during storage, shipment, and display of the bird, when fresh or frozen.

BACKGROUND OF THE INVENTION

When previously eviscerated, whole, oven-ready birds are prepared at the poultry processing plant and are to be shipped to the market, some of the birds are transported, stored, and displayed for sale without being frozen. These "fresh" birds are ready for cooking by the purchaser or by the retail store without the inconvenience or time delay involved in thawing a frozen bird. However, in many instances the purchaser wishes to receive the whole birds in a frozen condition or, in some cases, the purchaser will freeze the birds received from the processing plant so as to preserve the birds for later use and sale.

When the previously eviscerated oven-ready whole bird carcasses are frozen, there is a likelihood that the shapes of the birds will be changed, usually somewhat collapsed from their usual anatomical shapes, such as the neck of the bird bent and the visceral cavity of the bird somewhat collapsed or deformed. When the frozen bird is retrieved from cold storage to be placed in an oven, etc., it is very difficult to insert a spit or skewer through the bird so as to impale the bird and support the bird during cooking. The skewer could comprise an elongated, thin rod that is to project from the vent opening, through the visceral cavity and through the neck cavity so as to support the bird. In some instances, the bird might be placed with its visceral cavity mounted on a vertically oriented conical skewer for cooking. In either situation, the typical frozen bird is difficult to mount on a skewer. The elongated skewer is likely not to be able to protrude through the neck cavity because the neck of the bird would have been deformed, possibly bent downwardly during freezing and is too rigid to be straightened for receiving a skewer. Likewise, if the bird is to be mounted with its visceral cavity surrounding a vertically oriented conical skewer, the visceral cavity of the bird is likely to have been frozen in a shape that does not match the shape of the conical skewer. As a result, the bird must be thawed before it becomes flexible enough to conform in shape to the skewer or other mount. The thawing process requires a time delay and, therefore, delay in the cooking and other handling processes.

It is to the solution of the above noted deficiencies that this invention is directed.

SUMMARY OF THE INVENTION

Briefly described, the present invention comprises a method of shaping previously eviscerated oven-ready whole bird carcasses in a predetermined configuration that is compatible with the use of a spit, skewer or other internal support and which is compatible with storing, shipping, displaying and cooking the birds.

Once the whole bird has been properly eviscerated, including the drawing of the viscera from the visceral cavity of the bird as well as the drawing of the crop and other organs from the neck of the bird, a disposable mandrel is inserted through the vent, through the visceral cavity and into the neck cavity of the bird. The mandrel is of a size and shape compatible with the typical bird being processed, such as a three pound previously eviscerated, oven-ready whole chicken. Preferably, the mandrel is of a length suitable for extending from the vent through the visceral cavity and into the neck a distance so that the neck of the bird is distended from the main body of the bird without significant drooping of the neck occurring. The other end of the mandrel is of a larger size so as to fill and shape the visceral cavity of the bird. Once the mandrel has been inserted into the bird, the bird can be packaged, shipped, stored, displayed, purchased and even cooked without removing the mandrel and without the likelihood of experiencing a significant change in shape. Moreover, the bird can be frozen in this shape and later thawed. Usually, all of these functions can be performed without likelihood of significantly changing the shape of the bird.

The mandrels are formed in substantially duplicate size and shape so that all of the birds that receive the mandrels will have a substantially uniform interior dimension and shape that will be suitable for use on skewers of standard size and the standard inside dimensions of the birds as formed by the skewers tends to make the cooking of the birds more uniform and predictable.

The preferred embodiments of the mandrel as disclosed herein include a disposable, non-reusable cylindrical tube which is reshaped at one of its ends with longitudinally extending alternately facing parallel folds which reduce the diameter of the end of the cylindrical tube and form corrugations or alternate ridges and grooves about the tube. The reduced diameter end of the tube is approximately conical. The reduced end of the tube, because of its corrugations, becomes radially compressible in response to external forces, whereas the cylindrical end of the tube remains substantially radially rigid. The tube, because of its shape, is longitudinally rigid.

The mandrel is inserted, smaller end first, through the vent of the bird through the previously eviscerated visceral cavity of the bird, and into the previously eviscerated neck cavity of the bird. In the course of inserting the mandrel into the bird, the smaller, corrugated end of the mandrel engages the internal surfaces of the bird, and this contact with the bird tends to squeeze the smaller, corrugated end of the tube to a smaller breadth. In the meantime, the overall tube exerts radially outwardly directed forces in the internal cavities of the bird, which tend to maintain the cavities in their more normal circular configurations.

When the birds that have the mandrels inserted therein are compressed, as when birds are stored one on top of the other, the forces of the weight of several layers of birds is not enough to deform or otherwise misshape the lowermost birds in the stack.

The insertion of the mandrel into the eviscerated cavities of the bird tend to cause the neck of the bird to distend axially with respect to the visceral cavity of the bird making a substantially rectilinear internal passageway through the bird. Therefore, if the bird is frozen, the neck of the bird more likely will be maintained in alignment with the visceral cavity of the bird, so that a skewer, etc. can be inserted through the frozen bird without having to straighten the neck and therefore without the hazard of breaking or otherwise damaging the neck of the bird when attempting to straighten the neck. Also, the visceral cavity of the bird which receives the cylindrical portion of the mandrel tends to maintain a rounded shape suitable for receiving a skewer or other internal mounting device.

The skewers which are inserted into the visceral cavities of the birds typically will be of a uniform size and shape, so that the circular end of the skewer will conform to the shapes of conical mounts or other items of a given size.

Typically, the mandrel will be made of flame-resistant material which is compatible with and usable in the cooking of the bird, so that the mandrel does not have to be withdrawn from the bird during thawing, cooking, etc.

In the first embodiment of the invention, the mandrel is formed of substantially impervious material. However, in another embodiment, the mandrel is formed with openings extending therethrough which more readily permit the movement of heat and vapor through the mandrel. Further, the material of the mandrel can be made so that it is pervious to heat and vapor without requiring the formation of holes in the material.

The shape of the mandrel is such that it is compressible radially, but not axially. This makes it convenient for the insertion of the mandrels into the cavities, particularly the neck cavities of the birds, such that during the insertion process, the mandrels will not collapse axially, while the corrugated end of the mandrel is capable of collapsing radially.

In another embodiment of the invention, once the mandrel has been inserted into the visceral cavity of the bird as described herein, the cylindrical opening of the mandrel that faces out of the visceral cavity of the bird can be used for supporting other items that might be desired by the potential purchaser of the bird. For example, other food items or literature can be placed in the cylindrical cavity of the mandrel for access by the potential ultimate customer of the bird.

Thus, it is an object of this invention to provide a method and apparatus for shaping a previously eviscerated oven-ready whole bird carcass for packaging, shipment, storage and display that tends to retain the shape of the bird in a suitable configuration for baking or other cooking.

Another object of the invention is to provide a poultry shaping mandrel which is collapsible radially and non-collapsible axially, and which can be inserted into a previously eviscerated visceral and neck cavities of a bird for distending the neck and maintaining the breadth of the visceral cavity of the bird.

Another object of the invention is to provide a bird shaping mandrel of cylindrical shape at one end and of corrugated, reduced breadth shape at its other end, for maintaining the internal shape of a bird.

Another object of the invention is to provide a mandrel for yieldingly supporting the internal surfaces of a previously eviscerated oven-ready bird carcass.

Another object of the invention is to provide a bird shaping mandrel for maintaining the visceral cavity of a bird in a predetermined size and shape.

Another object of the invention is to provide a method of maintaining the internal shape of a bird carcass after the bird has been prepared for market.

Other objects, features and advantages of this invention will become apparent upon reading the following specification, when taken in conjunction with the accompanying drawings.

BRIEF DESCRIPTION OF THE DRAWINGS

FIG. 1 is a perspective, expanded illustration of a previously eviscerated whole, oven-ready bird carcass, showing a bird shaping mandrel extending from the vent of the bird, and a package that is to be carried by the mandrel.

FIG. 2 is a side view of a bird, similar to FIG. 1, but showing the poultry shaping mandrel inserted through the vent, visceral cavity and into the neck of the bird.

FIG. 6 is a schematic illustration of the method of producing the corrugated end of the bird shaping mandrel of FIGS. 1–4.

DETAILED DESCRIPTION

Figure 3:
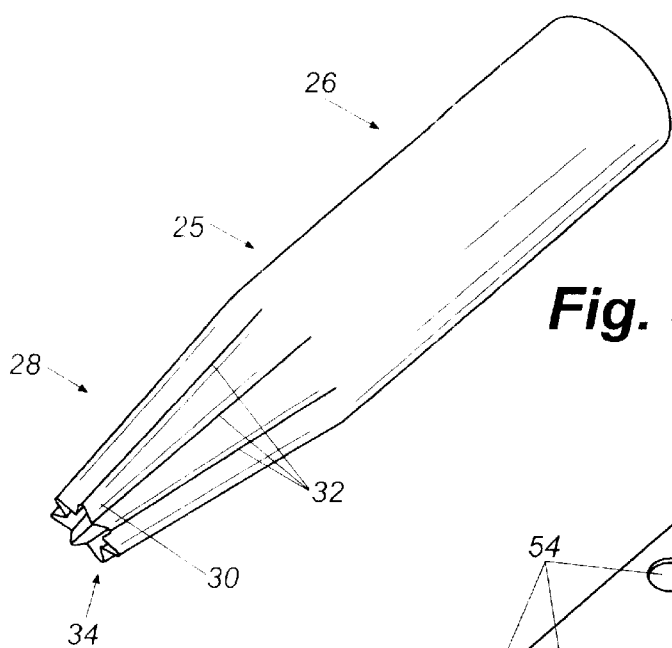
FIG. 3 is a perspective illustration of the bird shaping mandrel of FIGS. 1 and 2.

Referring now in more detail to the drawings, in which like numerals indicate like parts throughout the several views, FIG. 1 illustrates a previously eviscerated oven-ready whole bird 10 which is to be shipped to market from a poultry processor. The bird includes its breast 12, neck 14, legs 16, and vent 18 that leads into the visceral cavity and neck cavity of the bird. As illustrated in FIG. 2, the neck cavity 20 extends longitudinally from the position of the head through the neck 14, and the visceral cavity 22 of the bird is positioned between the back 11 and breast 12, with the vent 18, visceral cavity 22 and neck cavity 20 intersecting each other and forming an internal visceral passage through the bird 10.

As illustrated in FIGS. 1 and 2, a poultry shaping mandrel 25 is inserted through the vent 18, through the previously eviscerated visceral cavity 22, and through the previously eviscerated neck cavity 20. The mandrel 25 has a larger end 26 and smaller end 28, with the configuration of the larger end 26 being cylindrical and the configuration of the smaller end being approximately conical with corrugations of parallel, alternately facing ridges and grooves.

As illustrated in more detail in FIG. 3, the smaller end 28 of the mandrel is tapered inwardly to a smaller lateral breadth than the larger end 26. This progressively decreasing breadth is formed by the alternate folds at the smaller end, with the ridges 30 extending outwardly and the grooves 32 extending inwardly to form a corrugated external surface. The distal end 34 is of the smallest breadth of the mandrel, with the smaller end progressively enlarging as it tapers outwardly toward the larger, cylindrical end 26. forming a generally conical shape.

The configuration of the smaller end of the mandrel is such that the smaller end is radially partially collapsible without destruction, whereas the larger cylindrical end is generally not collapsible except when under large destructive compressive forces. As a result, when the mandrel is thrust through the vent, through the visceral cavity and into the neck cavity of the bird 10, the contact of the smaller compressible end of the mandrel tends to cause the mandrel to reduce itself in its breadth at the smaller end. However, because of the shape of the corrugations of the mandrel, as the corrugations become sharper and more reduced in breadth, the folds of the corrugations begin to support each other and the material of the smaller end of the mandrel becomes biased against and more radially supportive of the bird. Moreover, the tapered shape of the mandrel tends to resist over-insertion of the mandrel into the neck cavity of the bird, so that the mandrel will not be thrust too far into the visceral and neck cavities of the bird. As the cylindrical shape of the mandrel reaches the constriction provided by the transition between the visceral cavity and the neck cavity of the bird, the mandrel tends to resist constriction, thereby causing the mandrel to terminate its inward movement into the visceral cavity of the bird.

As shown in FIG. 1, an optional feature of the invention is the use of the internal cylindrical space 27 at the larger, cylindrical end 26 of the mandrel. Other objects can be mounted in and carried with the bird in the space 27, such as other food items, advertisements, coupons, etc. For example, gizzards, livers and other visceral items of the bird can be enclosed in a package 38 of a size compatible with the cylindrical space 27 of the mandrel, and the package can be inserted into the space and carried with the bird.

Figure 5:
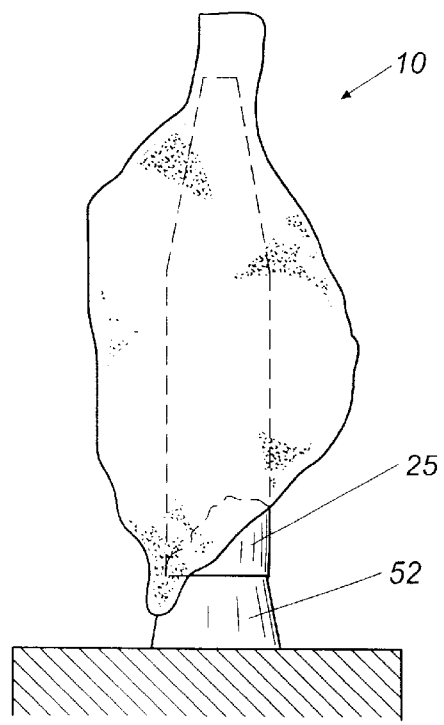
FIG. 5 is a side view of a bird supported on a mandrel and the mandrel and bird supported on a cooking skewer, showing how the bird can be supported for cooking freezing or thawing.

FIG. 5 illustrates how a cooking skewer 52 can support the bird during cooking, freezing, or thawing of the bird. The package 38 (FIG. 1) is removed from the cylindrical end of the mandrel and the open cylindrical end of the mandrel is mounted on the skewer. is The upper end of the skewer is slightly conically shaped and is of a height and breadth that forms a friction fit with the mandrel so as to firmly support the mandrel during cooking, etc.

As shown in FIG. 6, the mandrel can be formed from segments 40 of cylindrical stock, such as cardboard. An end of the cylindrical segments can be formed by conventional means into the desired shape of the mandrel. For example, the segments 40 of cylindrical stock can be inserted about a forming mandrel 42, and thrust downwardly into a shaping collar 44. The tapered, corrugated lower end 46 of the forming mandrel is positioned adjacent the lower end 48 of the segment 40, and then the forming mandrel 42 and cylindrical segment 40 are thrust downwardly into the shaping collar 44. The corrugations of the lower, tapered corrugated end of the forming mandrel will register with the inwardly protruding corrugations 50 of the shaping collar so as to form the corrugated shape at the lower end 48 of the cylindrical segment.

Other means of forming the corrugated end of the poultry shaping mandrel can be used, as may be available.

Figure 4:
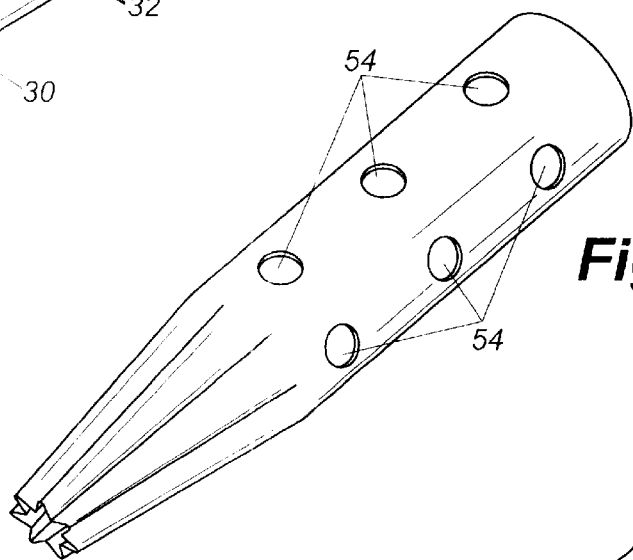
FIG. 4 is a perspective illustration of a bird shaping mandrel, similar to FIGS. 1–3, but with the mandrel including openings for the movement of heat and vapor.

While the poultry shaping mandrel 25 has been described with an unbroken yet folded surface, FIG. 4 shows another embodiment of the invention where the material of the mandrel has been formed with holes 54 extending through the cylindrical end of the mandrel. The holes 54 are of sufficient size and shape to permit the passage of heat and moisture therethrough so as to enhance the freezing and thawing of the bird and to enhance the cooking of the bird when the mandrel is left in place during the cooking procedure. Also, the grooves 32 about the corrugated smaller end of the mandrel permit the passage of heat and vapor in the neck portion of the bird during freezing, thawing and cooking.

Although preferred embodiments of the invention have been disclosed in detail herein, it will be obvious to those skilled in the art that variations and modifications of the disclosed embodiments can be made without departing from the spirit and scope of the invention as set forth in the following claims.

What is claimed is:

1. A method of shaping a previously eviscerated oven ready carcass of a bird having a vent opening, visceral cavity and neck cavity, so that the bird does not lose its shape when delivered to the market place, either in fresh or frozen condition, comprising:

providing a tubular mandrel having both a first end that is formed with a plurality of longitudinally extending corrugations which are arranged to impart an approximately conical shape to the first end of the mandrel and a second end that is of larger breadth than said first end and is cylindrical; the mandrel being of a length to extend from the vent opening through the visceral cavity and into the neck cavity so that when the mandrel is in place in said bird, the neck is distended from the main body, the second end of the mandrel being larger than the first end so as to fill and shape the visceral cavity;

inserting said mandrel, first end first, through the vent opening and into the visceral cavity and neck cavity of said bird, said first end being radially yieldable when urged into contact with the neck cavity of the bird and said second end that is of larger breadth than said first end and is cylindrical and is radially unyieldable when urged into contact with the visceral cavity of a bird;

as the mandrel is inserted, urging with the first end of the mandrel the surfaces of the neck cavity of the bird outwardly and urging with the second end of the mandrel the surfaces of the visceral cavity of the bird outwardly, in response to the first end of the mandrel urging the neck cavity of the bird outwardly, constricting of the first end of the mandrel occurs to fit the neck cavity of the bird, and maintaining the shape of the visceral cavity and neck cavity of the bird with the mandrel's second end positioned in the visceral cavity of the bird.

2. The method of shaping a bird of claim 1, and farther including the step of freezing the bird with the mandrel in the bird.

3. The method of claim 2, and further including the step of cooking the bird with the mandrel inserted therein.

4. The method of shaping a bird of claim 1, and further including the step of cooking the bird with the mandrel positioned in the visceral cavity of the bird, and maintaining the shape of the bird as the bird is cooked.

5. The method of claim 1, and further including the step of shaping the neck cavity of the bird with the smaller first end portion of the mandrel, and shaping the visceral cavity of the bird with the second end portion of the mandrel.

6. The method of claim 1, wherein the mandrel is formed of tubular cardboard and defines an open ended passage therethrough, and the step of inserting the mandrel into the visceral cavity of a bird comprises inserting the mandrel far enough through the visceral cavity to have the passage of the mandrel extend into the neck of the bird.

7. The method of claim 1, and wherein the step of inserting the mandrel into the neck cavity of the bird includes aligning the neck cavity of the bird with the visceral cavity of the bird.

8. The method of claim 1 and further including supporting the bird with the mandrel and, while the bird is supported with the mandrel, cooking the bird.

9. The method of claim 1, and further including the step of inserting a skewer through the mandrel and supporting the bird and mandrel with the skewer as the bird is cooked.

10. The method of claim 1 and wherein the step of inserting a mandrel into the bird comprises inserting the tubular mandrel into the bird, with the mandrel defining a longitudinal passage extending therethrough and lateral openings in communication with the longitudinal passage, and maintaining communication through the lateral openings of the mandrel between the longitudinal passage of the mandrel and the surfaces of the visceral cavity of the bird.

11. The method of claim 1 wherein the step of inserting the mandrel into the visceral and neck cavity of the bird comprises moving the mandrel into the neck cavity a distance which causes the neck of the bird to distend with respect to the carcass of the bird.

12. A previously eviscerated oven-ready frozen whole bird having a vent opening, visceral cavity and neck cavity, said bird having a disposable mandrel extending from and through the vent opening and into both the neck cavity and visceral cavity of the bird with the breadth of the neck cavity and the breadth of the visceral cavity of the bird supported by the mandrel, said mandrel being formed of tubular cardboard with one end being tapered and formed with longitudinally extending corrugations that are radially yieldable when urged into engagement with the neck cavity and with the other end of said mandrel formed cylindrically and being radially unyieldable when urged into contact with the visceral cavity, said mandrel being of a size such that said one end causes the neck cavity to be distended from the main body and said second end which is cylindrical fills and shapes the visceral cavity in a cylindrical shape so that the bird does not lose its shape when delivered to the market place, either in fresh or frozen condition.

13. The bird of claim 12, wherein said bird is characterized by having been frozen with the mandrel in place in the visceral cavity of the bird.

14. The bird of claim 12 and further including another product positioned in said mandrel.

15. The bird of claim 14, wherein said product is a comestible product.

16. The bird of claim 15, wherein said comestible product is a portion of viscera drawn from a bird.

17. The bird of claim 14, and wherein said product is of a shape compatible with the shape of said tubular shape of said mandrel.

* * * * *